(12) United States Patent
Karadag

(10) Patent No.: US 12,291,490 B2
(45) Date of Patent: May 6, 2025

(54) METHOD AND APPARATUS FOR PRODUCING LIQUID NITROGEN FERTILIZER AND PLASMA ACTIVATED WATER

(71) Applicant: Burak Karadag, Swindon (GB)

(72) Inventor: Burak Karadag, Swindon (GB)

(*) Notice: Subject to any disclaimer, the term of this patent is extended or adjusted under 35 U.S.C. 154(b) by 1115 days.

(21) Appl. No.: 17/149,306

(22) Filed: Jan. 14, 2021

(65) Prior Publication Data

US 2021/0130246 A1 May 6, 2021

(51) Int. Cl.
*C05C 5/00* (2006.01)
*B01J 19/08* (2006.01)

(52) U.S. Cl.
CPC ............... *C05C 5/00* (2013.01); *B01J 19/088* (2013.01); *B01J 2219/0894* (2013.01)

(58) Field of Classification Search
CPC ... C05C 5/00; B01J 19/088; B01J 2219/0894; B01J 4/004; B01J 10/002; B01J 12/002; B01J 2219/0815; B01J 2219/0869; B01J 2219/0871; B01J 2219/0898
See application file for complete search history.

(56) References Cited

U.S. PATENT DOCUMENTS

| | | | | |
|---|---|---|---|---|
| 3,155,489 A | * | 11/1964 | Thompson | C05B 11/14 71/37 |
| 4,010,897 A | * | 3/1977 | Treharne | B05B 7/30 239/289 |
| 4,133,671 A | * | 1/1979 | Mikel | C05C 11/00 71/64.08 |
| 4,141,715 A | * | 2/1979 | Wyse | B01J 19/088 422/186 |
| 4,287,040 A | * | 9/1981 | Alamaro | C01B 21/32 422/186.21 |
| 4,297,123 A | * | 10/1981 | Wyse | B01J 19/088 422/186 |
| 4,505,795 A | * | 3/1985 | Alamaro | C01B 21/30 422/186.21 |
| 4,915,915 A | * | 4/1990 | Treharne | B01J 19/088 422/186.21 |
| 5,846,286 A | * | 12/1998 | Tseng | C05G 5/23 71/58 |
| 9,440,889 B2 | * | 9/2016 | Ingels | C12M 47/18 |
| 10,004,749 B2 | * | 6/2018 | Hsu | A61P 25/36 |
| 10,350,572 B2 | * | 7/2019 | Locke | C05C 5/00 |
| 10,556,817 B2 | * | 2/2020 | Locke | C02F 9/00 |
| 10,688,465 B2 | * | 6/2020 | Salerno | C05G 5/20 |
| 2001/0040089 A1 | * | 11/2001 | Hemingway | F01N 3/0892 422/186.21 |
| 2003/0051993 A1 | * | 3/2003 | Ricatto | H05H 1/2406 204/164 |
| 2003/0150709 A1 | * | 8/2003 | LaBarge | F01N 3/2882 422/186.04 |
| 2007/0101783 A1 | * | 5/2007 | Gross | C05C 3/00 71/11 |
| 2011/0120880 A1 | * | 5/2011 | Jiang | C25B 3/00 205/552 |

(Continued)

*Primary Examiner* — Kevin R Kruer

(57) ABSTRACT

The invention relates to a method and apparatus for in situ production of liquid nitrogen fertilizer and plasma activated water for agricultural nutrient management and irrigation water treatment. In the invention, there are two different kinds of plasma reactors operates in tandem.

15 Claims, 3 Drawing Sheets

(56) References Cited

U.S. PATENT DOCUMENTS

| | | | |
|---|---|---|---|
| 2015/0122632 A1* | 5/2015 | Lynch | H01J 37/32055 |
| | | | 422/186.21 |
| 2016/0102025 A1* | 4/2016 | Nunnally | A01G 7/06 |
| | | | 422/162 |
| 2017/0189887 A1* | 7/2017 | Hruska | B01J 19/088 |
| 2018/0071707 A1* | 3/2018 | Salerno | B01F 23/2341 |
| 2018/0327283 A1* | 11/2018 | Pemen | B01J 19/088 |
| 2018/0354794 A1* | 12/2018 | Dammeier | B01D 53/8628 |
| 2019/0062231 A1* | 2/2019 | Winchell | H01J 37/32 |
| 2020/0071199 A1* | 3/2020 | Lewis, III | H05H 1/48 |
| 2020/0407247 A1* | 12/2020 | Horikoshi | C02F 1/4608 |
| 2021/0106968 A1* | 4/2021 | Dobrynin | B01J 19/088 |
| 2021/0130246 A1* | 5/2021 | Karadag | B01J 19/088 |
| 2021/0214222 A1* | 7/2021 | Kondiboyina | B01J 19/088 |
| 2021/0252470 A1* | 8/2021 | Wise | H10N 10/00 |
| 2021/0322945 A1* | 10/2021 | Brunecker | H05H 1/247 |
| 2021/0327708 A1* | 10/2021 | Hong | C23C 16/405 |
| 2021/0331135 A1* | 10/2021 | McEnaney | B01J 19/122 |
| 2021/0354105 A1* | 11/2021 | Lewis, III | B01J 19/088 |
| 2021/0402362 A1* | 12/2021 | Ingels | C01B 21/24 |
| 2023/0151287 A1* | 5/2023 | Trelles | B01J 19/088 |
| | | | 204/164 |
| 2023/0219052 A1* | 7/2023 | McEnaney | B01D 53/185 |
| | | | 71/58 |
| 2023/0257267 A1* | 8/2023 | Hwangbo | C01B 21/24 |
| | | | 423/405 |
| 2023/0373877 A1* | 11/2023 | Trelles | A01C 23/023 |

* cited by examiner

Figure 2:
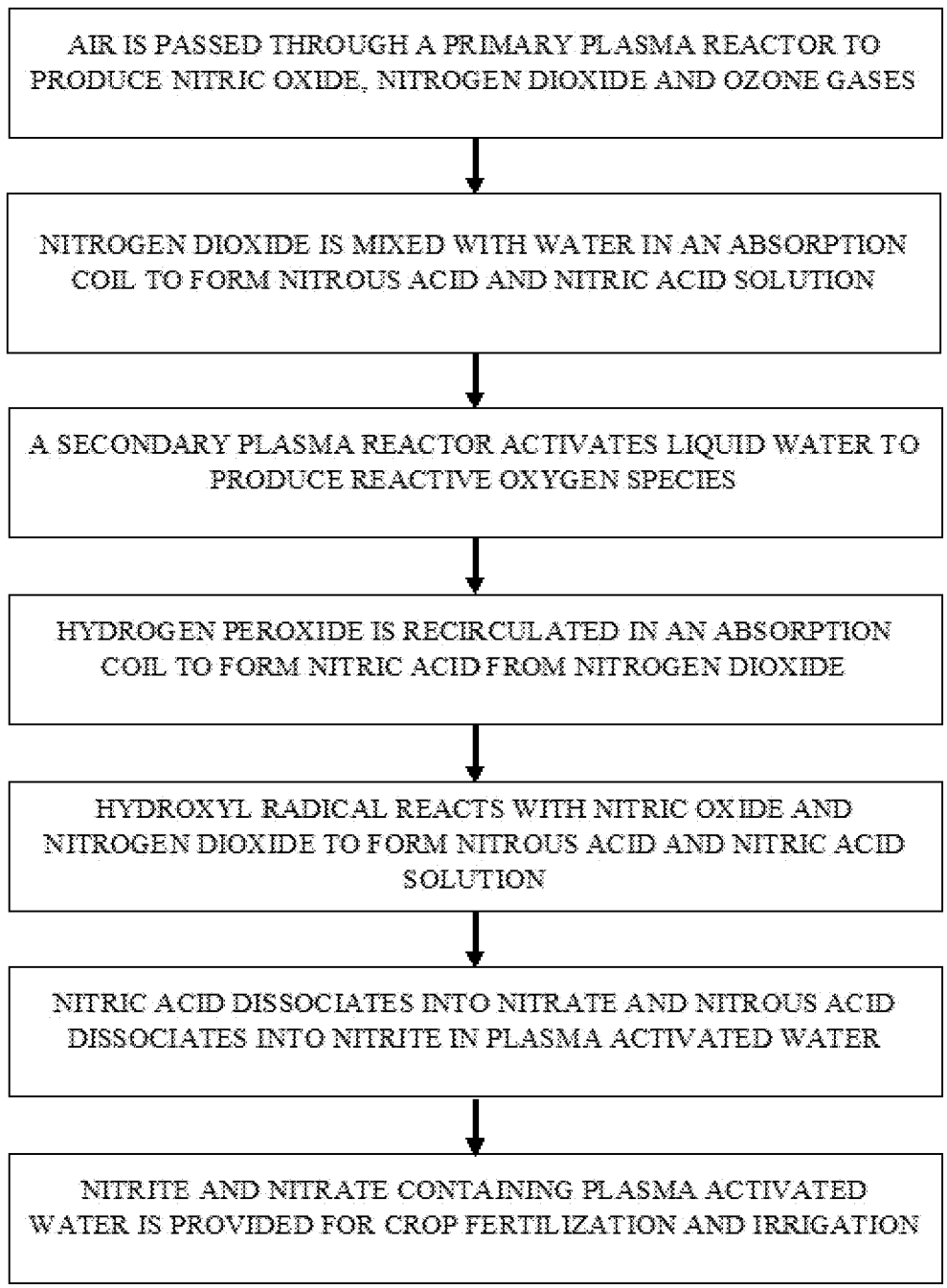

Figure 2 (Previously presented)

METHOD AND APPARATUS FOR PRODUCING LIQUID NITROGEN FERTILIZER AND PLASMA ACTIVATED WATER

TECHNICAL FIELD

The invention relates to a method and apparatus for in situ production of liquid nitrogen fertiliser and plasma (ionized gas) activated water reactive for agricultural nutrient management and irrigation water treatment.

PRIOR ART

Nitrogen fixation, conversion of unreactive nitrogen gas in the air into more reactive compounds of nitrogen in soil, is essential to the growth of plants and life on Earth. The Birkeland-Eyde process was an industrial process to fixate nitrogen by passing air through an electric arc to produce synthetic nitrates until it was replaced by the Haber-Bosch (H-B) process.

The H-B process relies on fossil fuels, and has massive carbon footprint accounting for 1% of global annual $CO_2$ emissions and 2% of the world energy consumption. [1] Ammonia-based fertiliser production via the H-B process is highly centralized, while the consumption is dispersed globally in agricultural areas. The need for transportation therefore further increases greenhouse gas emissions, and associated costs, and limit distribution resulting in inability to enrich soils in remote and impoverished regions. Also, the overall process of fertiliser application is quite inefficient due to leaching of a large amount of nitrogen content from soil, which fouls ground water in the form of nitrates, and enter the atmosphere as nitrous oxide, a greenhouse gas 300 times worse than carbon dioxide. The nitrogen retention after excessive fertiliser usage could damage the soil and ground water health as well.

There is a need for developing new sustainable and distributed approaches for fixing nitrogen. During the last two decades non-thermal plasma in contact with liquids as an alternative to the electric arc (thermal plasma) process have received a lot of attention for in situ nitrogen fixation. Although state-of-the-art plasma reactors cannot compete with the H-B process in terms of energy efficiency and product yield (despite the fact that theoretical limit of energy consumption for non-thermal plasma-based process is lower than the limitation of H-B process [2]), plasma-based process is the enabling technology for small-scale, on-demand and decentralised fertiliser production, and has the advantage of integration with renewable energy, making the process sustainable. On-demand production coupled with precision-farming techniques, the inefficiency and environmental pollution of the fertiliser application may also be remedied.

For example, decentralised and small-scale production may resolve the bottleneck around nitrogen fertiliser supply in sub-Saharan Africa (SSA). Fertiliser consumption, and thus crop yields, in SSA remains the lowest when compared with other regions due to high retail prices related to transportation costs and poor management of subsidy programs. [3] Fertilisers need to be transported across great distances making it so expensive outweighing the benefits of using them. The subsidy programs have often been poorly managed to help smallholder farmers on a sustained basis most severely affecting smallholder farmers, the poorest members of society. There is a great demand for affordable nitrogen fertiliser as being unable access to nitrogen fertiliser is a key impediment in increasing agricultural production and incomes of smallholder farmers in SSA.

Plasma can react with air and treat water or "activate" to produce reactive nitrogen and oxygen compounds (e.g. nitric oxide and hydrogen peroxide) merely by the use of air, water and electricity. The resultant plasma activated water (PAW) is an effective liquid nitrogen fertiliser (as it typically contains nitrates and nitrites) and broad-spectrum biocidal agent. It may enhance seed germination, increase rooting speed, stimulate plant growth, prevent pests and disinfect wastewater. [4] PAW may increase plant uptake, and thus fertiliser use efficiency, because plants absorb nitrogen from the soil as nitrate and ammonium ions. It may also significantly reduce losses of nitrogen content in soil or organic waste by converting volatile ammonia into involatile ammonium as described in CA 2851348.

U.S. Pat. No. 4,297,123 describes a method and apparatus for small scale and on-site production of nitrate fertilisers in various forms. Nitrogen dioxide is produced from air, which passed through an electric arc occurs between the electrodes of a spark plug, and absorbed in water to make nitric acid, which dissociates into nitrate in water.

U.S. Pat. No. 8,951,481 describes a system for creating a nitrate combined with a liquid in which nitrogen dioxide is produced by passing air through a corona discharge cell. The nitrogen dioxide is injected into a water chamber to generate nitric acid.

U.S. Pat. No. 4,915,915 describes a system for nitrogen fertiliser using an electric arc process in which the electric arc necessary for the process is generated by piezoelectric elements actuated by a hammer mechanism powered by water pressure.

U.S. Pat. No. 7,992,641 describes a method and apparatus for on-site production of nitrate ions by an electric arc process in a water processing system to reduce the number of sulfate-reducing-bacteria in oil and gas reservoirs.

WO 2016/096751 describes a thermal and non-thermal plasma activated water reactor system to produce plasma activated water (PAW).

Prior art has not been able to cost-effectively scale down the electric arc process, whereas non-thermal plasma reactor designs have low fixed nitrogen throughput, and require expensive power supplies. For economic viability, energy efficiency of aqueous nitrogen compound production by plasma-based process should be increased one order of magnitude, and a no/low-maintenance plasma reactor system should be designed.

Aims of the Invention and Brief Description The main purpose of this invention is to produce aqueous nitrogen compounds such as nitrate ($NO^{3-}$) and nitrite ($NO^{2-}$) containing liquid nitrogen fertiliser and plasma (ionized gas) activated water.

The object of the present invention is to provide an energy efficient high throughput method and a low-cost low-maintenance mobile apparatus to make nitrogen fertilisers more accessible to smallholder farmers reducing the reliance on resource and capital intensive fertiliser factories and associated high-cost distribution networks.

To provide a solution to the above-mentioned challenges, a method and apparatus is provided that includes two different kinds of plasma reactors operating in tandem. Having cylindrical electrodes concentrically aligned with a dielectric tube (8), the primary plasma reactor (5) has two discharge channels (10,12) providing stable dielectric barrier discharge and relatively larger discharge area. A large discharge area is desirable not only for higher yield of NOx gases but also for more uniform heat distribution on the electrode (9,11) surfaces increasing the lifetime i.e. lower material erosion. The secondary plasma reactor (17) produces plasma discharge between upper and lower liquid electrodes (21, 22), which eliminates the electrode erosion problem of plasma reactors with metal electrodes, prevents toxic metal contamination due to the electrode erosion, and reduces maintenance costs.

The upper liquid electrode (21) of the secondary plasma reactor (17) comprises of multiple liquid droplets providing relatively larger area of gas-liquid interface for improved absorption rate of discharge by products.

The apparatus uses an absorption unit in coil structure (27), which is a long length of plastic tubing shaped into a coil, to enhance NOx gas absorption in the lower liquid electrode (22). There are multiple swirlers (29) or static mixers within the absorption coil plastic tube to increase absorption yield.

Recirculation of the liquid flow in the secondary plasma reactor (17) leads to greater transport rate of the reactive oxygen and nitrogen species (ROS and RNS) into the liquid water due to increased interaction between plasma discharges and liquid water.

NOx gas absorption in liquid water is quite difficult compared to other exhausted gas such as $NH_3$ due to its low water solubility. Efficiency of NOx gas absorption is increased by generating and mixing hydrogen peroxide in the absorption liquid and recirculating it in the absorption coil (27).

Ozone oxidation in liquid water or lower liquid electrode (22) of the secondary plasma reactor (17) can convert NO gas, which has low water solubility, to the more soluble $NO_2$ gas. Water dissolved ozone can convert nitrous acid to nitric acid in the water phase. Nitric acid dissociates into nitrate in lower liquid electrode (22).

A slow but continuous fertilization and irrigation routine is adopted. The apparatus may include a control unit to control and monitor air compressor, liquid pumps, power supplies and concentration of nitrogen-containing compounds and oxygen-containing compounds generated in primary and secondary plasma reactors.

DEFINITION OF THE FIGURES OF THE INVENTION

Features of the present invention may be better understood with reference to the drawings described below. The drawings are not necessarily to scale; emphasis instead generally being placed upon illustrating the principles of the invention.

Figure 1:
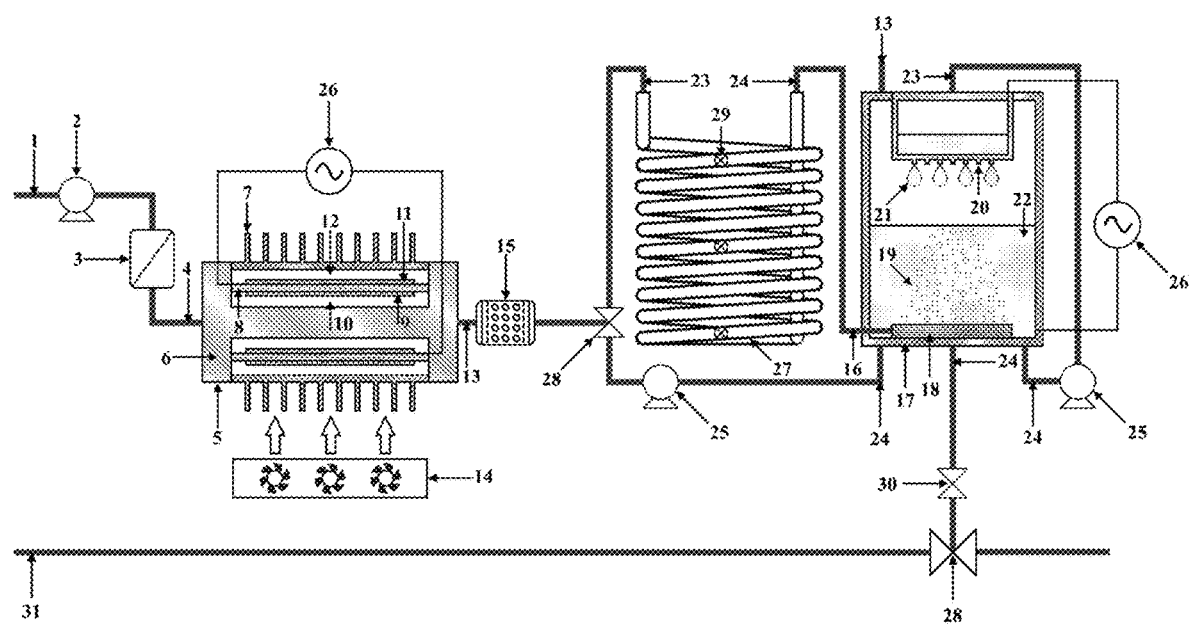

FIG. 1: An embodiment of the invention with primary plasma reactor, secondary plasma reactor and absorption coil.

FIG. 2: Flow chart, illustrating a method for in situ production of liquid nitrogen fertiliser and plasma (ionized gas) activated water reactive, according to one embodiment of the present invention.

Figure 3:
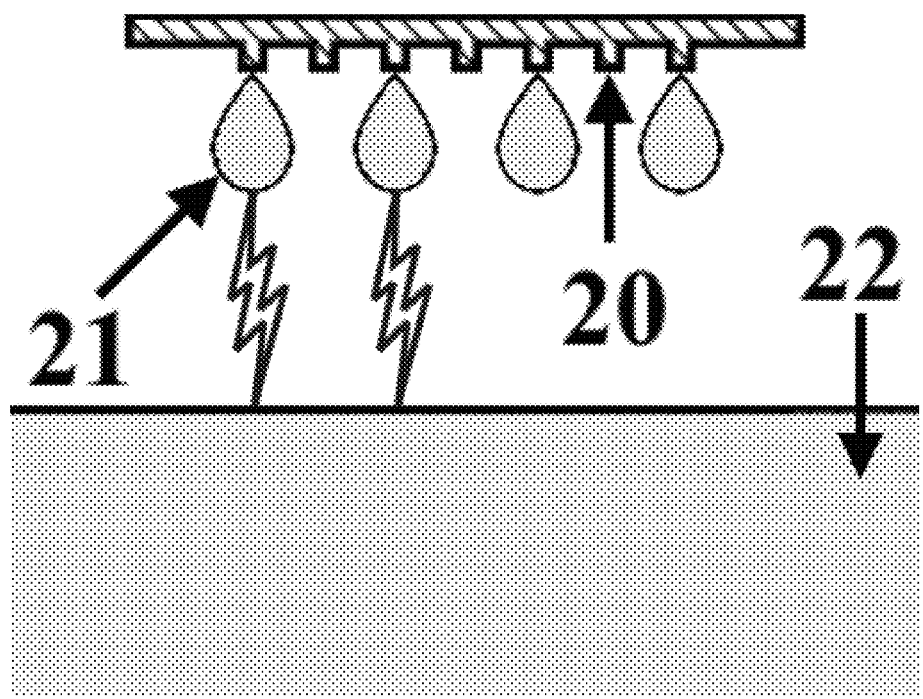

FIG. 3: An image of plasma discharge filaments formed between electrodes.

DEFINITIONS OF THE PARTS/ASPECTS/SECTIONS FORMING THE INVENTION

1: Air Source
2: Air Compressor
3: Air Dehumidifier Filter
4: Gas Inlet Port
5: Primary Plasma Reactor
6: Body Structure
7: Enclosing Structure
8: Dielectric Tube
9: Inner Electrode
10: Inner Discharge Channel
11: Outer Electrode
12: Outer Discharge Channel
13: Gas Outlet Port
14: Cooling Unit
15: Filter Unit
16: Liquid Inlet Port
17: Secondary Plasma Reactor
18: Bubble Diffuser
19: Fine Bubble
20: Droplet Generator
21: Upper Liquid Electrode
22: Lower Liquid Electrode
23: Liquid Inlet Port
24: Liquid Outlet Port
25: Liquid Pump
26: Power Supply
27: Absorption Coil
28: Venturi
29: Swirler
30: Valve
31: Drip Irrigation Pipe

DETAILED DESCRIPTION OF THE INVENTION

An apparatus for producing liquid nitrogen fertiliser and plasma activated water, comprising;

a) A primary plasma reactor (5) to convert air to reactive oxygen and nitrogen species (ROS and RNS) such as nitrogen oxides (NOx) and ozone, wherein said primary plasma reactor (5) comprises an inner annular-shaped discharge channel (10) and an outer annular-shaped discharge channel (12) to treat air; an inner electrode preferably anodized metal mesh electrode (9) and an outer electrode preferably anodized metal mesh electrode (11) which provide electric field for ionization of air; a gas outlet port (13) to release air containing discharge products.

b) A secondary plasma reactor (17) to convert air and water vapour to reactive oxygen and nitrogen species (ROS and RNS), wherein said secondary plasma reactor (17) comprises a liquid pump (25), which recirculates a liquid flow between a liquid outlet port (24) and a liquid inlet port (23); a liquid outlet port (24) to remove liquid water; liquid inlet port (23) to supply liquid water to the droplet generator; a gas outlet port (13) to release treated air; an electrically conductive lower liquid electrode (22) and an electrically conductive upper liquid electrode (21) to provide electric field for ionization of air and water vapour; a liquid drop or droplet generator (20) to generate water droplets, where the liquid drop or droplets serve as the upper liquid electrode (21).

As shown in FIG. 1 and FIG. 3, the secondary plasma reactor comprises a housing with an interior space that has the liquid drop or droplet generator positioned at an upper end; and a reservoir for water to accumulate at the lower end.

c) At least one absorption coil (27) to increase efficiency of NOx gas absorption, wherein said absorption coil (27) comprises a liquid pump (25), which recirculates a liquid flow between a liquid outlet port (24) and a liquid inlet port (23); liquid outlet port (24) to remove liquid water, a liquid inlet port (23) to supply liquid water into the absorption coil (27), and at least one swirler (29) to improve air and water mixing. Lower liquid electrode (22) of secondary plasma reactor (17) is liquid water recirculated in the absorption coil (27).

A preferred embodiment of the present invention may be understood with reference to FIG. 1. An air compressor (2) takes air comprising nitrogen, oxygen and other gaseous elements from an air source (1), passes it through an air dehumidifier filter (3), and delivers dried air to a primary plasma reactor (5).

Primary plasma reactor (5) comprises a gas inlet port (4), which supply air from an air source (1), a body structure (6), which also serves as air distributor, an airtight enclosing structure (7) to enclose the body structure (6), which includes heat sink and cooling fins, an inner annular-shaped discharge channel (10), an outer annular-shaped discharge channel (12), an inner electrically conductive electrode (9), an outer electrically conductive electrode (11), a dielectric tube (8), a gas outlet port (13) and high voltage high frequency alternating current (AC) power supply (26), which biases said inner and outer electrodes (9,11).

Electrodes of primary and secondary plasma reactors (5, 17) are connected to at least one power supply which is selected from group of high voltage high frequency alternating current (AC) supply, high voltage direct current (DC) power supply, pulsed AC power supply, pulsed DC power supply or any combination thereof, to provide electric field for ionization of gases in the plasma reactors. Power supplies for primary and secondary plasma reactors (5, 17) can be same type or different type.

Absorber coil (27) and secondary plasma reactor is a set and the apparatus comprise at least one set, wherein gas outlet port (13) is connected to another set of absorber coil (27) and secondary plasma reactor (17). In another embodiment, number of set is at least two. In general, a method of producing liquid nitrogen fertiliser and plasma activated water comprises following steps:

Delivering air to an electric arc, dielectric barrier discharge, nanosecond pulsed electric field, or electromagnetic wave driven primary plasma reactor, or any combination thereof, to ionize and decompose nitrogen and oxygen molecules in air into the constituent atoms to form nitric oxide, nitrogen dioxide and ozone gases, Feeding the air containing nitric oxide, nitrogen dioxide and ozone gases to an absorption unit, and absorbing the discharge byproducts into an absorption liquid in the absorption unit to form nitrous acid and nitric acid solution, Activation of the absorption liquid to produce hydrogen peroxide, hydroxyl radical and ozone by an electric arc, dielectric barrier discharge, nanosecond pulsed electric field, or electromagnetic wave driven secondary plasma reactor to increase absorption efficiency through reaction of the nitrogen dioxide gas with hydrogen peroxide in the absorption liquid to form nitric acid, Reaction of nitrogen dioxide and nitric oxide with hydroxyl radical to form nitric acid and nitrous acid, Reaction of nitrogen molecules in air and the absorption liquid with ozone to form nitrous acid, Reaction of nitrous acid with ozone to form nitric acid, Dissociation of nitric acid into nitrate and nitrous acid into nitrite in the plasma activated liquid, Providing the nitrite and nitrate containing plasma activated water for crop fertilization and irrigation.

FIG. 2 summarizes a method of producing liquid nitrogen fertiliser and plasma activated water with the apparatus comprises following steps;

To be taken of air comprising nitrogen, oxygen and other gaseous elements from an air source (1) by an air compressor (2), Delivering dried air to a primary plasma reactor (5), Ionization and decomposition of nitrogen and oxygen molecules in air into the constituent atoms to form reactive oxygen and nitrogen species (ROS and RNS) in the discharge channels (10,12) due to application of a strong electric field between the inner and outer electrodes (9,11), Below chemical reactions where the reactions are only the major reactions and are not limiting, Introducing air containing discharge byproduct gases nitric oxide, nitrogen dioxide and ozone gases from the gas outlet port (13) into a venturi (28) within the output line of a liquid pump (25), which recirculates a lower liquid electrode (22) between a liquid outlet port (24) and a liquid inlet port (16) to form an acidic nitrogen solution comprising nitrates and nitrites through $2NO_2+H_2O \rightarrow HNO_2+HNO_3$, Nitric acid dissociates into nitrate, and nitrous acid dissociates into nitrite in lower liquid electrode (22) through the reactions $HNO_3+H_2O \leftrightarrows H_3O^++NO_3^-$ and $HNO_2+H_2O \leftrightarrows H_3O^++NO_2^-$, Conversion of nitrogen molecules in air and ozone in absorption lower liquid electrode (22) to nitrous acid through the reaction $N_2+O_3+H_2O \rightarrow 2HNO_2$, Conversion of nitrous acid to nitric acid in the water phase through the reaction $HNO_2+O_3 \rightarrow HNO_3+O_2$, Conversion of nitric oxide to nitrogen dioxide through the reaction $NO+O_3 \rightarrow NO_2+O_2$, Plasma activation of water and generation of reactive oxygen species in a secondary plasma reactor (17), Mixing of hydrogen peroxide with the absorption lower liquid electrode (22) and recirculating it in the absorption coil (27) to increase absorption efficiency of nitrogen dioxide in liquid water (and thus nitric acid concentration) through the reaction 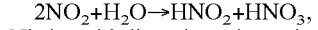 $2NO_2+H_2O_2 \rightarrow 2HNO_3$, Conversion of nitric oxide and nitrogen dioxide to nitrous acid and nitric acid through the reactions: $NO+OH \rightarrow HNO_2$, $NO_2+OH \rightarrow HNO_3$.

As the air travels through the discharge channels (10,12), nitrogen and oxygen molecules are ionized, and decomposed into the constituent atoms to form reactive nitrogen species (RNS) such as nitrogen oxides (NOx gases) in the discharge channels (10,12) due to application of a strong electric field between the inner and outer electrodes (9,11). A filter unit (15) is configured to remove any structural fragments coming from the plasma discharge channels due to erosion or to selectively pass discharge byproduct gases to control plasma chemistry. Cooling unit (14) serve to cool down the primary plasma reactor (5) and the power supplies (26).

In order to form an acidic nitrogen solution comprising nitrates and nitrites through the chemical reaction $2NO_2+H_2O \rightarrow HNO_2+HNO_3$, the air containing NOx gases and other discharge byproduct gases are introduced to a venturi (28) through the gas outlet port (13) within the output line of a liquid pump (25), which recirculates a lower liquid electrode (22) between a liquid outlet port (24) and a liquid inlet port (16). An absorption coil (27), which includes a liquid inlet port (23), liquid outlet port (24) and a series of swirlers (29) or static mixers to provide substantial gas-liquid exposure. The liquid outlet port (24) is connected to a secondary plasma reactor (17) through the liquid inlet port (16).

The secondary plasma reactor (17) includes a liquid pump (25), which recirculates a liquid flow between a liquid outlet port (24) and a liquid inlet port (23), a gas outlet port (13), a bubble diffuser (18) to form fine bubbles (19), an electrically conductive liquid lower electrode (22), a liquid drop or droplet generator (20), where the liquid drop or droplets serve as upper liquid electrode (21), and high voltage high frequency AC power supply (26), which biases said electrodes.

Electrical breakdown of water vapour and air due to strong electric field in the gap between the two electrode surfaces (21, 22) of the secondary plasma reactor (17) develop luminous plasma discharge filaments, which activate/treat water, and produce reactive oxygen species (ROS) due to presence of liquid water and water vapour and reactive nitrogen species (RNS) due to presence of nitrogen gas in the air delivered to the secondary plasma reactor (17). Plasma discharge filaments in the secondary plasma reactor (17) extinguish and regenerate continuously as water drops encounters surface of the lower liquid electrode (22), and the droplet generator (20) creates new water drops. An embodiment of the invention has been tested. A multiple number of plasma discharge filaments form between the two electrode surfaces (21, 22) as shown in FIG. 3.

Some reactive oxygen species generated in the secondary plasma reactor (17) are short-lived hydroxyl radical and long-lived hydrogen peroxide, which increase the absorption efficiency of $NO_2$ in water and nitric acid concentration through the reactions: $NO+OH \rightarrow HNO_2$, $NO_2+OH \rightarrow HNO3$, $2NO_2+H_2O_2 \rightarrow 2HNO_3$. Nitric acid dissociates into nitrate in lower liquid electrode (22) through the reaction $HNO_3+H_2O \rightarrow H_3O^+ + NO_3^-$. Another reactive oxygen species generated in both primary plasma reactor and secondary plasma reactor (17) is ozone. Ozone oxidation in liquid water or lower liquid electrode (22) can convert NO gas, which has low water solubility, to the more soluble $NO_2$ gas through the reaction $NO+O_3 \rightarrow NO_2+O_2$. Water dissolved ozone can convert nitrous acid to nitric acid in the water phase through the reaction $HNO_2+O_3 \rightarrow HNO_3+O_2$. Nitric acid dissociates into nitrate in lower liquid electrode (22) through the reaction $HNO_3+H_2O \rightarrow H_3O^+ + NO_3^-$.

Remaining nitrogen gases that are not fixed in the secondary plasma reactor (17) may be fed back into the primary plasma reactor (5) or released into atmosphere by the gas outlet port (13) after passing through a filter unit (not shown in FIG. 1). In another embodiment, the remaining gases may be directed by the gas outlet port (13) to another set of absorption coil (27) and a plasma reactor similar to the secondary plasma reactor (17).

A liquid outlet port (24), which is controlled by a valve (30), connect the secondary plasma reactor (17) to a venturi (28) to mix the aqueous nitrite and nitrate solutions and plasma activated water to drip irrigation pipes (31).

A liquid pump, which is not shown, is used to fill or empty the secondary plasma reactor (17). A valve, which is not shown, is placed within the input line of venturi (28), to assure that no liquid can flow backwards, and enter the primary plasma reactor (5). The apparatus is placed in a sheet metal cabinet to shield electromagnetic interference radiation. One can modify induced plasma chemistry e.g. concentration of NOx in the primary plasma reactor (5) or ROS and RNS in the secondary plasma reactor (17) by tailoring air pressure, treatment time, voltage, current, frequency or duty cycle of the high voltage high frequency power supplies (26) and water treatment time. Electrical energy to drive the apparatus may be obtained from mains, portable electric generators or renewable sources such as solar panels and wind turbines.

In one embodiment of the invention, the secondary plasma reactor (17) can include a mist maker, preferably ultrasonic mist maker in order to enhance generation of reactive species by spraying water mist into plasma discharge region. In another embodiment, a plurality of the primary plasma reactor (5) can be connected in series or parallel to the same the absorber coil (27) and/or plurality of the secondary plasma reactor (17) can be connected in series or parallel to the same absorber coil (27) to increase the amount of nitrate in the lower liquid electrode (22). In yet another embodiment, potash and phosphate containing materials may be added to the lower liquid electrode (22) according to the desired fertiliser characteristics.

The apparatus may be portable, and used to deploy the produced liquid fertiliser directly to a crop/plant. The nitrogen fertiliser may be used as it is produced by spraying, fed into the drip irrigation system or incorporated into a hydroponic system. Calcium carbonate ($CaCO_3$) may be added to the produced liquid nitrogen fertiliser and plasma activated water to convert nitric acid to calcium nitrate fertiliser through the chemical reaction $CaCO_3+2HNO_3 \rightarrow H_2O + CO_2 + Ca(NO_3)_2$, and use when needed.

REFERENCES

[1] Smil, V. (2004). Enriching the Earth: Fritz Haber, Carl Bosch, and the Transformation of World Food Production. Cambridge, MIT Press.
[2] Li, S. et al. (2018). Recent Progress of Plasma-Assisted Nitrogen Fixation Research: A Review. Processes 2018, 6(12), 248.
[3] Druilhe, Z. & Barreiro-Hurlé, J. (2012). Fertilizer Subsidies in sub-Saharan Africa. ESA Working Paper No. 12-04.
[4] Park, D. P. et al. (2013). Reactive Nitrogen Species Produced in Water by Non-Equilibrium Plasma Increase Plant Growth Rate and Nutritional Yield. Curr. Appl. Phys. 13, S19-S29.

What is claimed is:

1. An apparatus for producing liquid nitrogen fertilizer and plasma activated water, comprising:
  a primary plasma reactor, wherein said primary plasma reactor comprises:
    an inner annular-shaped discharge channel; an outer annular-shaped discharge channel positioned relative to the inner annular-shaped channel; an inner electrode disposed within the inner annular-shaped discharge channel; an outer electrode disposed within the outer annular-shaped discharge channel; and a gas outlet port;
    wherein the inner and outer annular-shaped discharge channels and the inner and outer electrodes are arranged concentrically;
    wherein a high-voltage power supply is configured to bias the inner and outer electrodes to convert air to reactive oxygen and nitrogen species including ozone and nitrogen oxides;
  a secondary plasma reactor, wherein said secondary plasma reactor comprises:
    a housing defining an interior space having a liquid drop or droplet generator positioned at an upper end; a gas outlet port; and a reservoir for water to accumulate at the lower end, wherein the housing comprises a first liquid inlet port, a first liquid outlet port, and a liquid recirculation pathway comprising a first liquid pump connecting between the first liquid outlet port and the first liquid inlet port; wherein the first liquid inlet port supplies liquid water to the liquid drop or a droplet generator;

an upper liquid electrode and a lower liquid electrode, wherein the liquid drop or droplet generator generates water droplets that act as the upper liquid electrode and wherein water in the reservoir acts as the lower liquid electrode, a high-voltage power supply connecting to both the upper and lower liquid electrodes to bias the liquid water supplied to the drop or droplet generator and the lower liquid electrode, such that plasma discharge filaments in the plasma reactor extinguish and regenerate continuously as the liquid water drop or droplets fall to the surface of the lower liquid electrode; the secondary plasma reactor configured for electrical breakdown between said upper and lower liquid electrodes to produce plasma activated water; and:

wherein there are no non-liquid electrodes within the interior space connected to the high-voltage power supply, to prevent toxic metal contamination of treated water due to electrode erosion; and at least one absorption coil coupled with the primary plasma reactor and the secondary plasma reactor, wherein said absorption coil is coupled to the secondary plasma reactor by liquid inlet port to supply liquid water from the lower liquid electrode of the secondary plasma reactor and a liquid outlet port to return liquid water to the secondary plasma reactor; wherein a liquid pump recirculates a liquid flow between the liquid inlet and outlet ports of the at least one absorption coil: wherein said absorption coil is coupled to the primary plasma reactor by a venturi which introduces the reactive oxygen and nitrogen species through the gas outlet port to the liquid flow supplied to the absorption coil: wherein the at least one absorption coil comprises a swirler or static mixer.

2. The apparatus for producing liquid nitrogen fertilizer and plasma activated water according to claim 1, wherein said primary plasma reactor further comprises a gas inlet port which supplies air from an air source.

3. The apparatus for producing liquid nitrogen fertilizer and plasma activated water according to claim 1, wherein said primary plasma reactor further comprises an air dehumidifier filter.

4. The apparatus for producing liquid nitrogen fertilizer and plasma activated water according to claim 1, wherein said primary plasma reactor further comprises a body structure, which also serves as air distributor.

5. The apparatus for producing liquid nitrogen fertilizer and plasma activated water according to claim 1, wherein said primary plasma reactor further comprises an airtight enclosing structure with heat sink fins.

6. The apparatus for producing liquid nitrogen fertilizer and plasma activated water according to claim 1, wherein said primary plasma reactor further comprises a filter unit configured to remove any structural fragments coming from the inner and outer annular-shaped discharge channels or to selectively pass gases.

7. The apparatus for producing liquid nitrogen fertilizer and plasma activated water according to claim 1, wherein said primary plasma reactor further comprises a cooling unit to cool down the primary plasma reactor.

8. The apparatus for producing liquid nitrogen fertilizer and plasma activated water according to claim 1, wherein said electrodes of primary and secondary plasma reactors are connected to at least one power supply which is selected from group consisting of high voltage high frequency alternating current (AC) supply, high voltage direct current (DC) power supply, high voltage pulsed AC power supply, high voltage pulsed DC power supply and any combination thereof, to provide electric field for ionization of gases in the plasma reactors.

9. The apparatus for producing liquid nitrogen fertilizer and plasma-activated water according to claim 8, wherein, a single high-voltage power supply powers both the primary and secondary plasma reactors or multiple high-voltage power supplies are used and each high voltage power supply is individually selected from the group of high voltage high frequency alternating current (AC) supply, high voltage direct current (DC) power supply, high voltage pulsed AC power supply, high voltage pulsed DC power supply and any combination thereof, to provide electric field for ionization of gases in the plasma reactors.

10. The apparatus for producing liquid nitrogen fertilizer and plasma activated water according to claim 1, wherein said secondary plasma reactor further comprises a bubble diffuser to form fine bubbles.

11. The apparatus for producing liquid nitrogen fertilizer and plasma activated water according to claim 1, wherein said secondary plasma reactor further comprises a mist maker in order to enhance generation of reactive oxygen and nitrogen species.

12. The apparatus for producing liquid nitrogen fertilizer and plasma activated water according to claim 1, wherein a plurality of said primary plasma reactor are connected in series or parallel to the absorption coil.

13. The apparatus for producing liquid nitrogen fertilizer and plasma activated water according to claim 1, wherein said absorption coil and said secondary plasma reactor is a set and the apparatus comprise at least one set.

14. The apparatus for producing liquid nitrogen fertilizer and plasma activated water according to claim 13, where number of said set is at least two.

15. The apparatus for producing liquid nitrogen fertilizer and plasma activated water according to claim 1 further comprises a control unit.

* * * * *